US006505343B1

United States Patent
Menon et al.

(10) Patent No.: US 6,505,343 B1
(45) Date of Patent: Jan. 7, 2003

(54) DOCUMENT/VIEW APPLICATION DEVELOPMENT ARCHITECTURE APPLIED TO ACTIVEX TECHNOLOGY FOR WEB BASED APPLICATION DELIVERY

(75) Inventors: Satish R. Menon, Portland, OR (US); Andrew J. Muray, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/223,739

(22) Filed: Dec. 31, 1998

(51) Int. Cl.[7] .................................................. G06F 9/44
(52) U.S. Cl. .................. 717/116; 717/100; 717/101; 717/102; 717/109; 717/113; 709/201; 709/203; 345/681
(58) Field of Search .................. 709/202, 203, 709/218, 201, 224; 717/1, 2, 145, 116, 100, 101, 102, 103, 105, 113, 107, 109; 345/744, 681, 666; 707/106.1, 10, 103 Z

(56) References Cited

U.S. PATENT DOCUMENTS

| 5,315,703 A | * | 5/1994 | Matheny et al. ............ 345/700 |
| 5,692,196 A | * | 11/1997 | Unni et al. .................. 717/145 |
| 5,768,510 A | * | 6/1998 | Gish .......................... 709/203 |
| 5,790,861 A | * | 8/1998 | Rose et al. .................. 717/145 |
| 5,848,246 A | * | 12/1998 | Gish .......................... 709/228 |
| 5,854,932 A | * | 12/1998 | Mariani et al. ............. 717/116 |
| 5,872,973 A | * | 2/1999 | Mitchell et al. ............ 709/332 |
| 5,907,704 A | * | 5/1999 | Gudmundson et al. ..... 717/100 |
| 5,987,242 A | * | 11/1999 | Bentley et al. ............... 703/13 |
| 5,999,972 A | * | 12/1999 | Gish .......................... 709/219 |
| 6,061,057 A | * | 5/2000 | Knowlton et al. .......... 345/744 |
| 6,083,277 A | * | 7/2000 | Folow et al. .................. 717/1 |
| 6,122,627 A | * | 9/2000 | Carey et al. .................. 707/4 |
| 6,237,135 B1 | * | 5/2001 | Timbol .......................... 717/1 |
| 6,304,893 B1 | * | 10/2001 | Gish .......................... 709/203 |

OTHER PUBLICATIONS

Title: A Distributed Architecture for Programming Environments, author: Clement, ACM, 1990.*
Title: The Design and Implementation of An Object Oriented Toolkit For 3D Graphics and Visualization, author: Schroeder et al, IEEE, 1996.*
Title: Class Management for Software Communities, author: Gibbs et al, ACM, 1990.*

* cited by examiner

Primary Examiner—Gregory Morse
Assistant Examiner—Chameli C. Das
(74) Attorney, Agent, or Firm—Kenyon & Kenyon

(57) ABSTRACT

A method for creating a large functional software component. The method includes the steps of building a large functional unit in a data/data presentation format and wrapping the large functional unit with an encapsulating program, creating a wrapped large functional unit. The method further includes the step of modifying the wrapped large functional unit to become operable with the encapsulating program.

8 Claims, 9 Drawing Sheets

DOCUMENT/VIEW APPLICATION DEVELOPMENT ARCHITECTURE APPLIED TO ACTIVEX TECHNOLOGY FOR WEB BASED APPLICATION DELIVERY

BACKGROUND OF THE INVENTION

The present invention relates generally to the transmission of information in a communications network. More particularly, the invention relates to encapsulating large functional units as software components to be used in different operating environments.

A communications network, such as the Internet, can transmit pages of information to a user's computer for display by a software program called a "browser." One example of such an information page is used in the World Wide Web (also called simply the "Web"), which transmits information pages over the Internet using hypertext markup language (HTML). The HTML data can include source codes that tell the browser how to display the page, including for example, the location and color of text and graphics. In general, a Web page can include combinations of text, graphics, sound video and small application software programs, such as "applets" written in the Java computer language developed by Sun Microsystems located in Palo Alto, Calif. and "ActiveX controls" developed by Microsoft Corporation located in Redmond, Washington and written in a variety of programming languages including Microsoft's Visual C++ and Microsoft's Visual Basic programming system.

Many software programs, including these small application software programs are created using Object-Oriented Programming (OOP) techniques which involve the definition, creation, use and destruction of "objects." Objects are self-sufficient software entities including data elements and routines, or functions, sometimes called methods, which are used to manipulate the data elements. The object's data and related functions are treated by the software as an entity and they can be created, used and deleted as if they were a unitary item. Together, the data and functions enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not per se objects themselves, but which act as templates that instruct a compiler how to construct an actual object. A class may, for example, specify the number and type of data variables and the steps involved in the functions which manipulate the data. An object is actually created in the program by means of a special function called a constructor which uses corresponding class definitions and additional information, such as arguments provided during object creation, to construct and initialize the object and its data members. Likewise objects are destroyed by a special function called a destructor. Objects are employed by using their data and invoking their functions to accomplish a task. In a simple example, a class could be defined as dogs having the characteristic of barking, running and panting. A collie would then be an object of the class dogs.

It is noteworthy to distinguish between an object and a class of objects. A class is a type definition or template used to create objects in programs. The objects created are merely each a single instance of the class of objects, which is just called a class. A class has no memory or behavior of its own except to serve as the blueprint from which objects can be created. As stated previously, an object is a self-sufficient component that includes both data and function. An object is of the same type as the class from which it has been derived. Objects are said to be instantations of their class and use memory for their data and functions, unlike the class template itself which does not.

Objects can represent physical things, such as airplanes in an air traffic control system, components in a stereo or television system, balance sheet and income statement elements in a fundamental analysis company business model, or stars in the simulated night sky on display at a planetarium. Objects can represent elements of the computer-user environment such as windows, scrollbars, sliders, menus or other graphical items. An object can represent a collection of data, such as a personnel file or a table of the latitudes and longitudes of cities, or an object can represent user-defined data types such as time, angles, and complex numbers, functions or points on the plane.

As the Web emerges as the primary medium for delivery of information and functional capabilities (i.e., application programs, etc.) to users, there arises a need to integrate large functional units, such as for example, large application programs created using Object-Oriented Programming (OOP) techniques, (i.e., Microsoft Word, Excel, CAD software programs, etc.) in a Web page to deliver to these users.

Large functional units have not been the focus of attention in the past because of processing considerations and bandwidth limitations. Conversely, the focus has been directed to delivering small functional units such as applets, ActiveX controls, etc. that perform specific tasks and produce small levels of functionality to the Web.

Thus, the present invention provides for encapsulating large functional units which can be operable in both the Web and the desktop environments.

SUMMARY OF THE INVENTION

According to an embodiment of the present invention, a method is provided for creating a large functional software component. The method includes the steps of building a large functional unit in a data/data presentation format and wrapping the large functional unit with an encapsulating program, creating a wrapped large functional unit. The method further includes the step of modifying the wrapped large functional unit to become operable with the encapsulating program.

DETAILED DESCRIPTION

Figure 1:
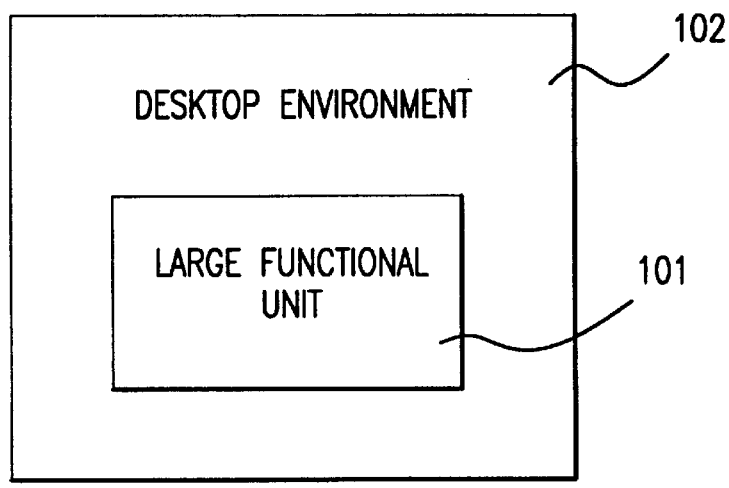
FIGS. 1–9 illustrate the process for creating an encapsulated large functional unit according to the teachings of the present invention.
Figure 2:
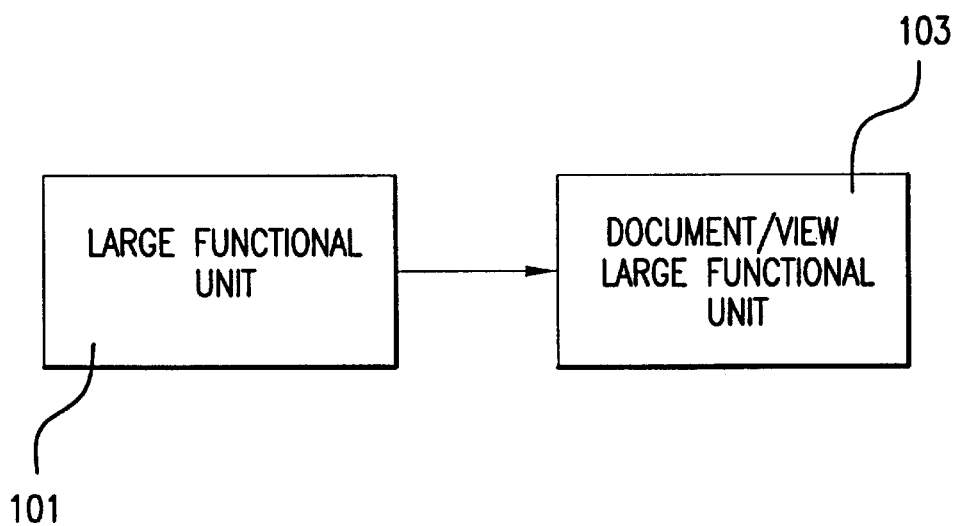

Embodimentd of the present invention are directed to a method and system for encapsulating large functional units as large functional software components to be used in different operating environments. Referring now in detail to the drawings wherein like parts are designated by like reference numerals throughout, FIGS. 1–2 illustrate creating a large functional unit in a data/data presentation format. FIG. 1 shows a desktop environment 102 for executing a large functional unit 101, such as a large application program. Large application programs include for example, word processing software programs, spreadsheet software programs, CAD software programs, etc. Desktop environment 102 includes an operating system, such as SUN Solaris, Windows 98 or Windows NT used to run large functional unit 101. Large functional unit 101 can be created for desktop environment 102 using a programming tool such as Microsoft Foundation Class (MFC) library. The MFC library is a collection of classes (generalized definitions used in object-oriented programming) that can be used in building large function units such as application programs. These classes can be written in the C++ programming language. The MFC library saves a programmer time by providing code that has already been written and provides an overall framework for developing the large application programs.

In order to create a large functional unit where data is separated from the presentation of the data, large functional unit 101 is designed in a data/data presentation format. One such example of a data/data presentation format is a document/view format 103 as shown in FIG. 2. This formatting process is achieved by separating the data (i.e., document) of the large function unit, into a document class and separating the presentation of the data (i.e., view) to a view class selected from the above-mentioned MFC library.

Figure 3:
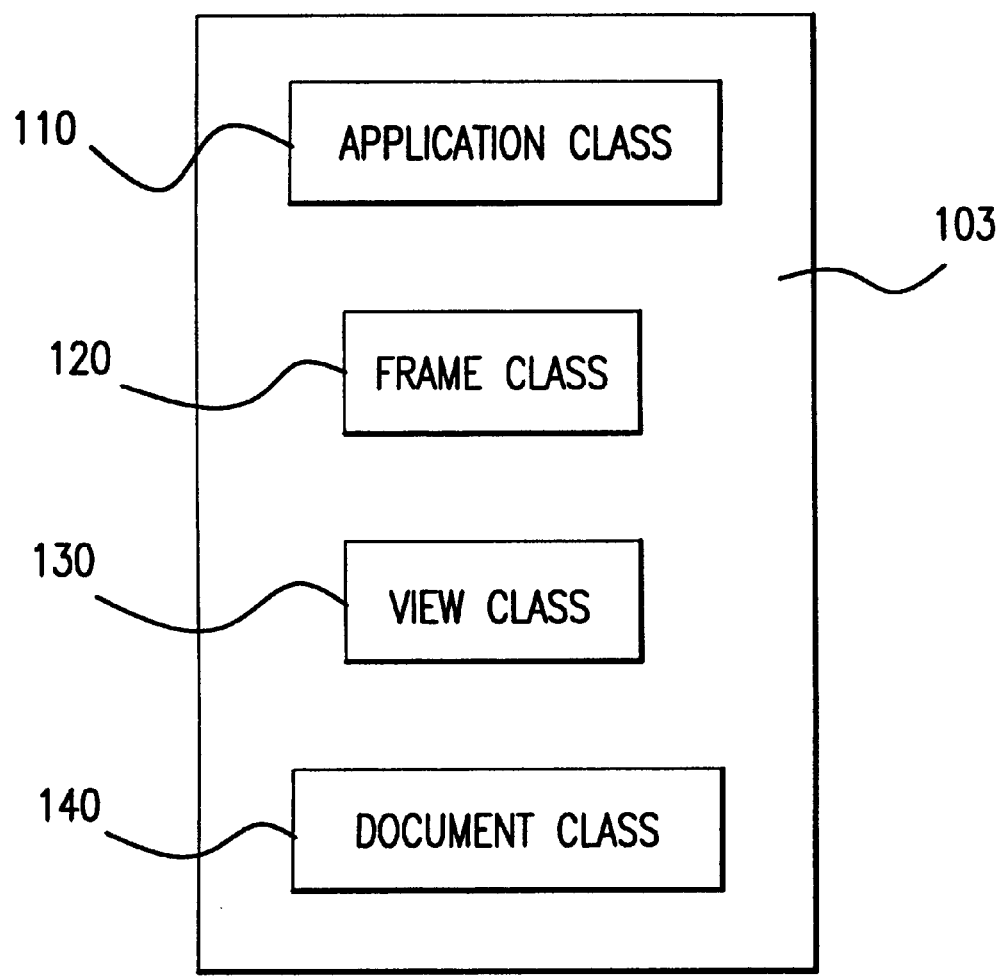

FIG. 3 is a detailed illustration of an embodiment of a document/ view large functional unit 103. Document/view large function unit 103 includes an application class 110, a frame class 120, a view class 130 and a document class 140. Each of these classes includes header files, source codes, objects and additional information used to operate document/view large function unit 103. Application class 110 functions as a controller for document/view large function unit 103. Applications class 110 controls the startup, initialization, execution and shutdown of document/view large function unit 103. Further included in application class 110 is an object (an application class object) that when instantiated, runs document/view large function unit 103.

The frame class 120 acts a main presentation display or a window for document/view large function unit 103. This window is used to display data from document class 140 in any format or manner defined by view class 130.

Figure 4:
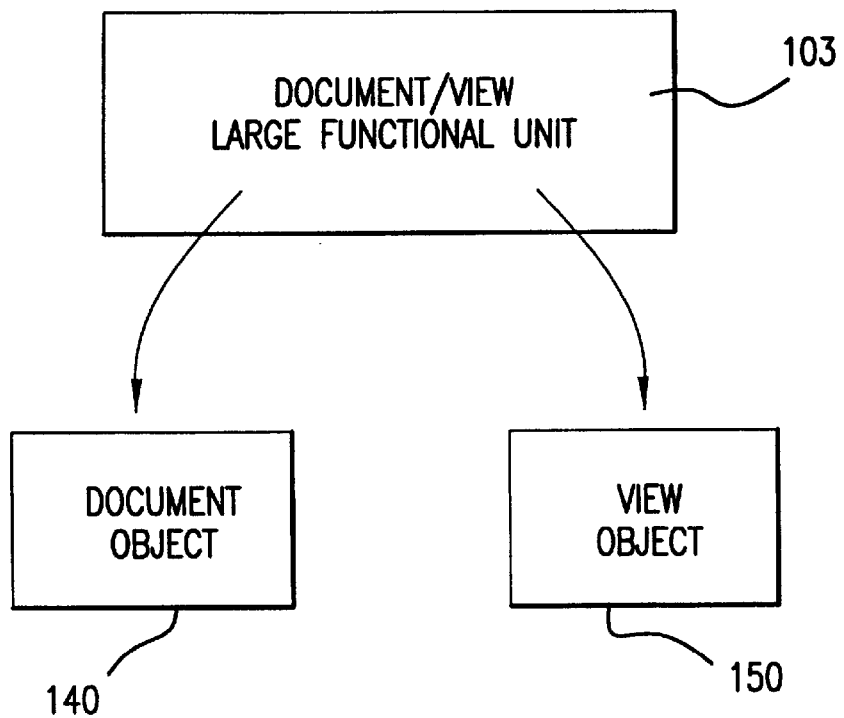

In document/view large functional unit 103, objects are dynamic. That is, when document/view large functional unit is run, a frame object (i.e. a window), a document object, and a view object are all created dynamically. Upon the creation of these objects, an association is established between a particular instance of the document object and a particular instance of the view object. FIG. 4 shows the creation of the document objects 140 and view objects 150 by document/ view large functional unit 103.

Figure 5:
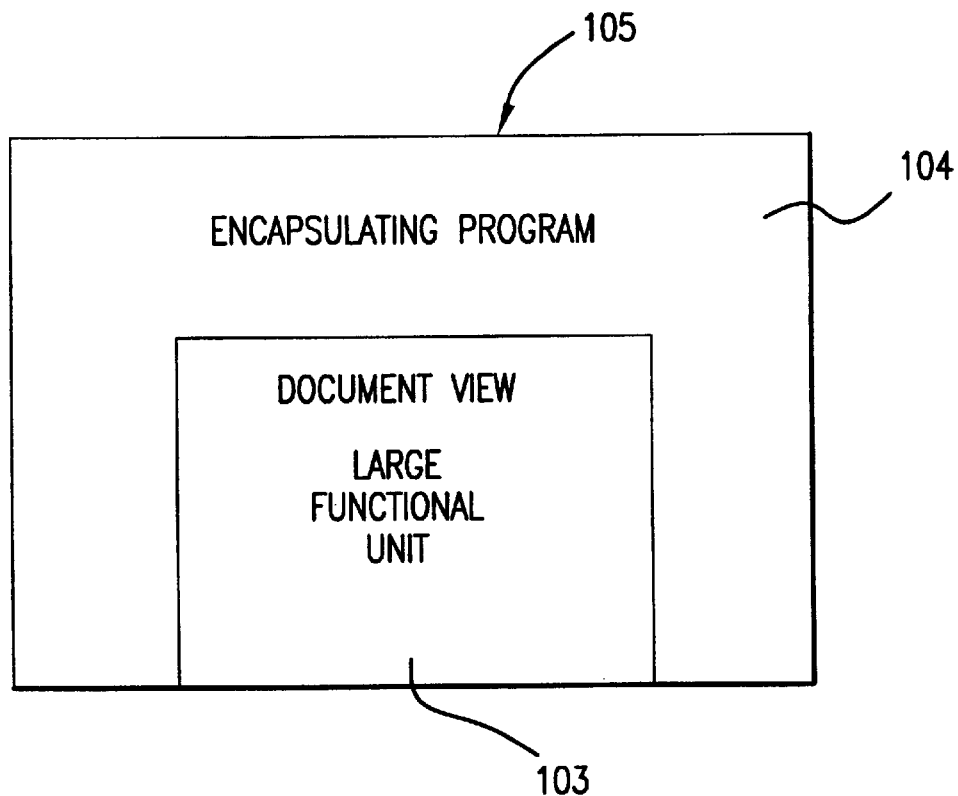

After the document/view large functional unit 103 has been created, document/view large functional unit 103 is then encapsulated with an encapsulating program 104 such as, for example, ActiveX , as shown in FIG. 5.

ActiveX is a programming language including a set of methodologies and procedures that allows for the creation of a software component called an ActiveX control. A software component is a reusable, self-contained module of code that may be used with other application programs. A software component can be "hooked onto" another application program, providing additional control or functionality. As stated above, software components have been designed for small functional units. However, as described in detail below and according to the teachings of the present invention, encapsulating program 104 can be modified to become operable with large functional units. Thus, a large functional software component can be created. This requires encapsulating program 104 to create a skeletal framework designed to incorporate implementation codes from the large functional unit. Implementation codes may include copied document and view classes. After the modifications are made to encapsulating program 104, large functional software component 105 is created.

Figure 7:
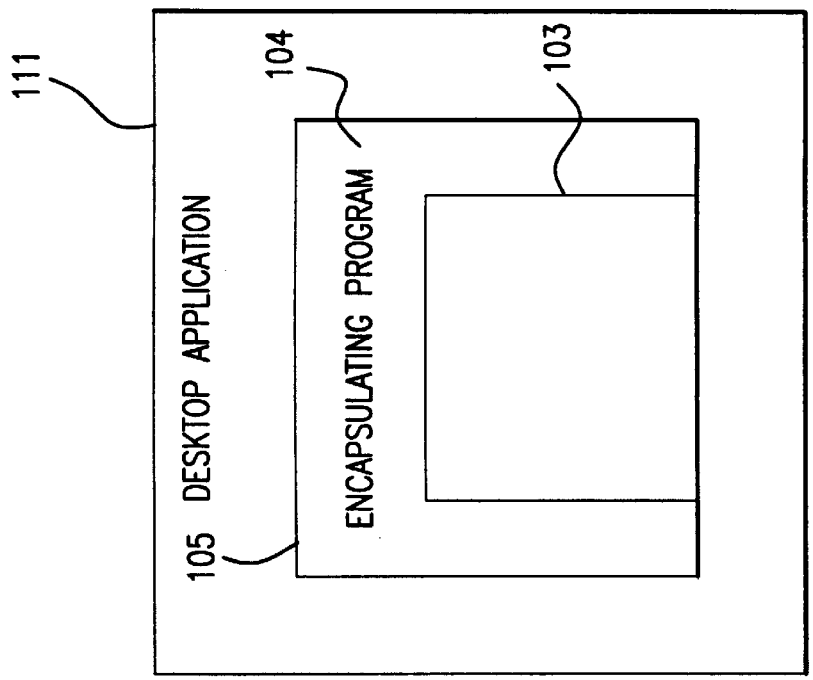
Figure 6:
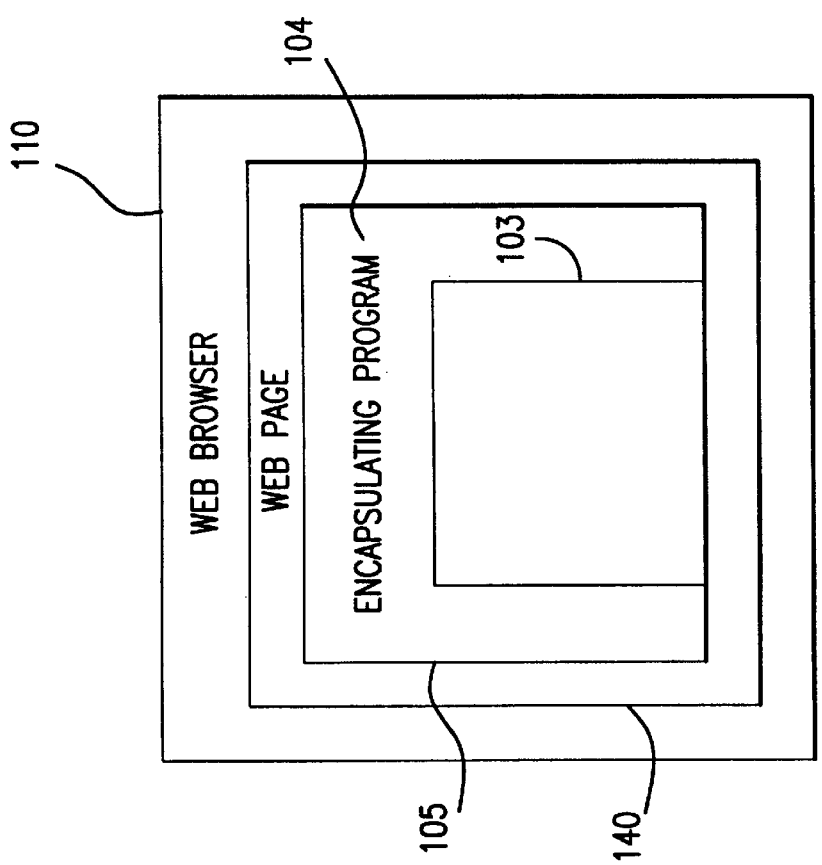

Large functional software component 105 can be embedded in Web pages and downloaded dynamically over the Internet. Large functional software component 105 can then be executed within a Web browser 110 as shown in FIG. 6. Alternatively, large functional software component 105 can be used in a desktop application 111 as shown in FIG. 7.

Figure 8:
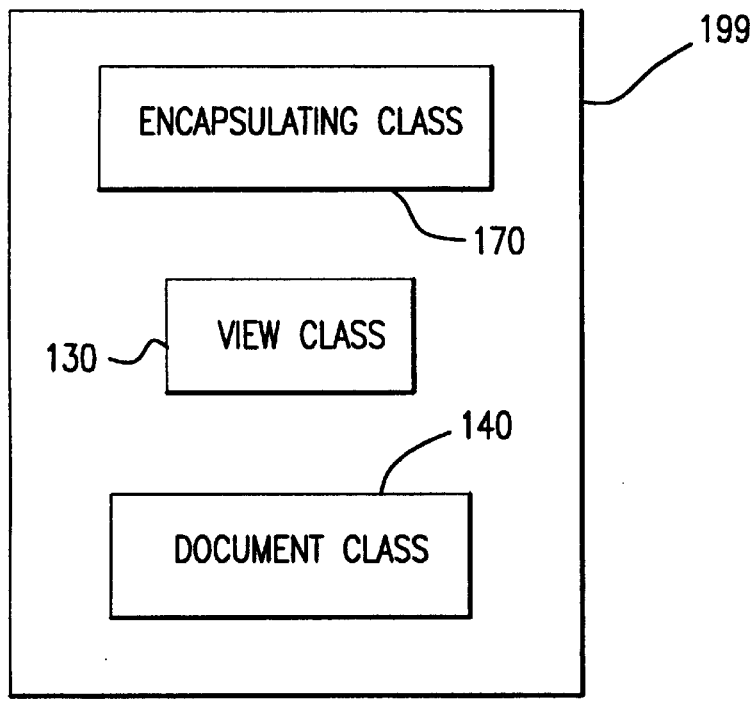

FIG. 8 shows encapsulating program skeletal framework 199 according to one embodiment of the present invention. Skeletal framework 199 includes an encapsulating class 170, copied view class 130 and copied document class 140 from document/view large functional unit 103. The encapsulation class 170 servers as a controller for managing and operating the encapsulated program 104. Encapsulating class 170 controls the startup, initialization, execution and shutdown of the encapsulating program 104. Further included in encapsulating class 170 is an object (an encapsulating class object) that when instantiated, runs encapsulating program 104.

Figure 9:
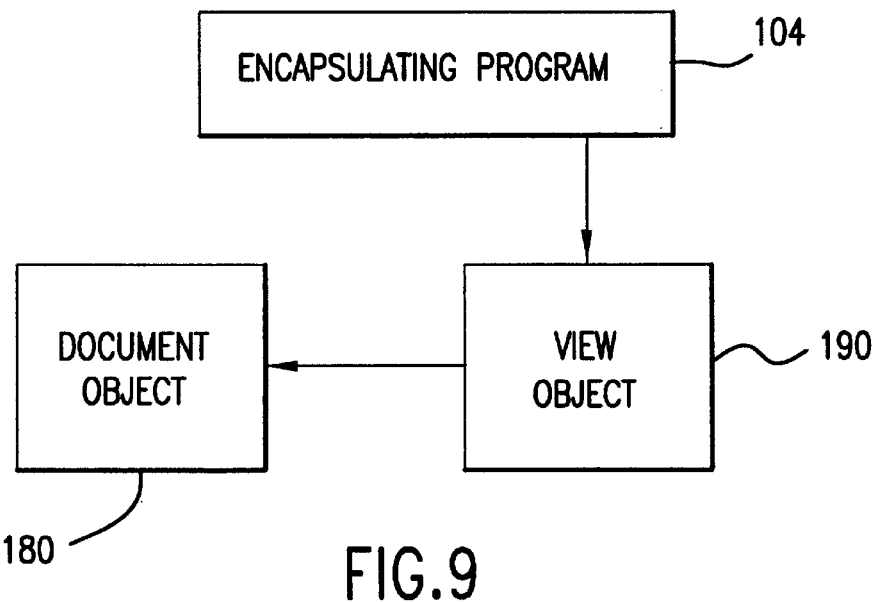

FIG. 9 shows the creation of the view objects 190 by the encapsulating program and the document object 180 created by the view object 190. According to the present invention, when view object 190 creates document object 180, the association established between a particular instance of the document object and a particular instance of the view object is maintained as in the document/view large functional unit 103.

Figure 10:
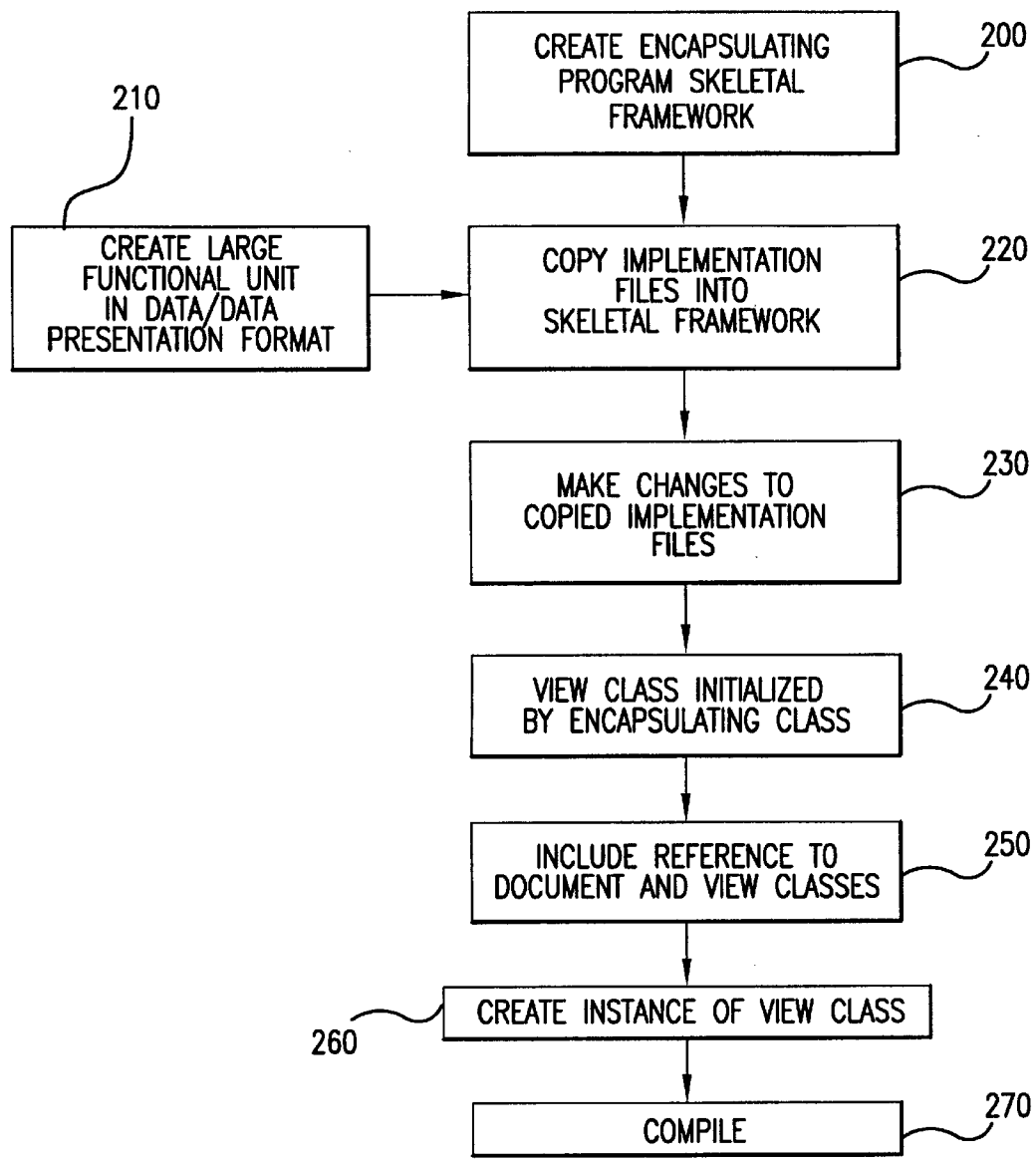
FIG. 10 is a flow chart of a process for creating an encapsulated large application program according to the teachings of the present invention.

FIG. 10 is a flow diagram of a process for creating a large functional software component encapsulating a large functional unit according to the teachings of the present invention. In step 200, an encapsulating program skeletal framework such as an ActiveX skeletal framework is created. The encapsulating skeletal framework provides the basic mechanism used to encapsulate small functional units.

In step 210, a large functional unit is created in a data/data presentation format such as a document/view format. The large functional unit in document/view format creates an application class, a frame class, a view class and a document class. In step 220, implementation codes such as the view class and the document class are copied into the encapsulating program skeletal framework.

In step 230, the document and view classes copied to the encapsulating program skeletal framework are modified. These modifications are to ensure that the large functional unit is operable in the encapsulating program environment. In other words, modifications are made such that the encapsulating skeletal framework is operable with large functional units. Specifically, these modifications include changing the header files in the document and view classes to reference the encapsulating class instead of the application class. This change allows the large functional unit to communicate with the encapsulating class instead of the application class.

In step 240 the copied view class is modified such that it is initialized by the encapsulating class instead of the application class and the view class source codes are modified such that an instance of the document class is created.

In step 250, the encapsulating class is modified to include all references to document and view classes.

In step 260 an instance of the view class is created in the encapsulating class. Also, in the encapsulating class initialization function, the view class is initialized.

In step 270, the encapsulating program skeletal framework is compiled. Whn the compiled encapsulating program is run the view objects are created and the view objects then create document objects.

Figure 11:
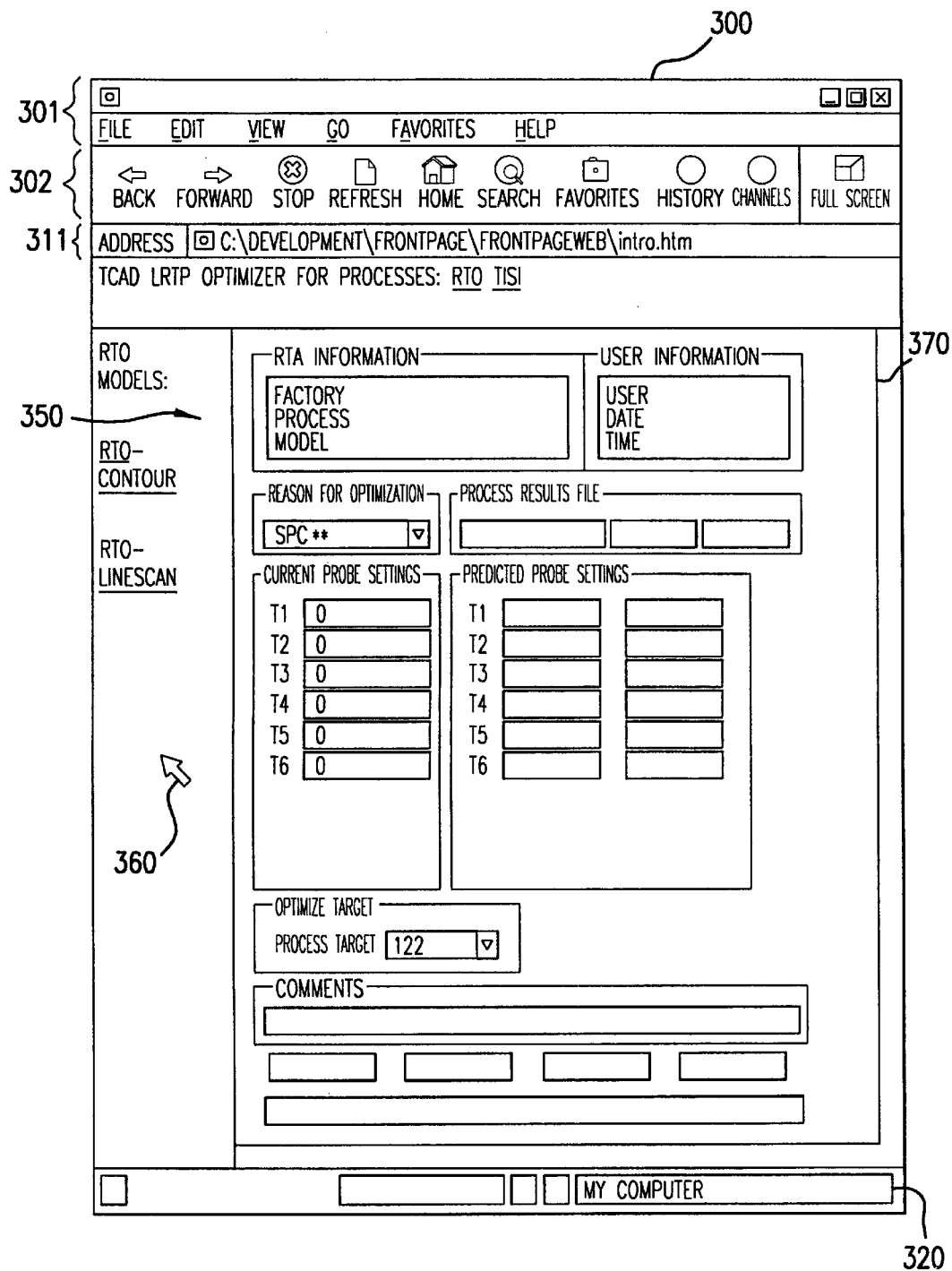
FIG. 11 illustrates a large functional software component embedded in a Web page according to the teachings of the present invention.

FIG. 11 illustrates an embodiment of an embedded large functional component 105 in a web page according to the teachings of the present invention. As shown in FIG. 11, a display window generated by a web browser, indicated generally at 300 can include a menu bar 301 and a plurality of buttons 302, each providing one of a variety of different functions for a user of the web browser. Display widow 300 also includes an address field 311 which serves a dual function of indicating the URL of the current location and of allowing a user to enter a new URL. In the illustrated example the web browser can be used to navigate the public Internet, and the URL shown in location field 311 is the URL of a web page on the world wide web. Display window 300 further includes a status bar 320 that provides information about the operation the web browser.

Display window 300 includes a displayed web page, indicated generally at 350 which is generated by the web browser. The user generally interacts with displayed window 300 and displayed web page 350 using a pointer device (i.e., a mouse) which controls the position of a pointer 360 and allows a user to initiate actions (i.e., through a mouse click). According to embodiments of the present invention, displayed web page 350 may include a display window for large functional software component 370. Display window for large functional software component 370 displays a large functional unit that can be activate via the Web by positioning pointer 360 over display window 370.

Figure 12:
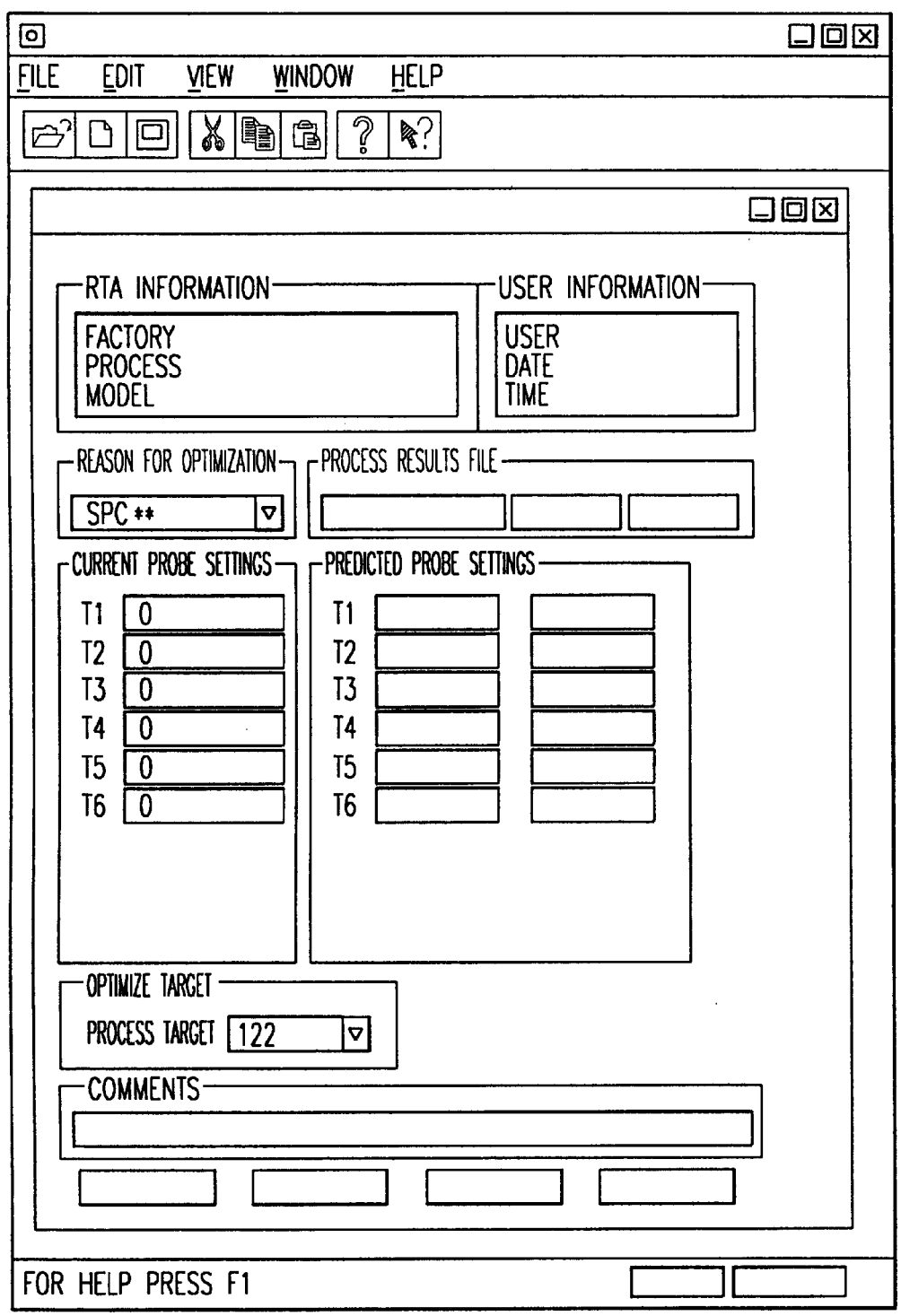
FIG. 12 illustrates a large functional software component used for desktop applications according to the teachings of the present invention.

FIG. 12 shows a display window for a large functional software component display 370 used for desktop applications. The desktop application shown operates in a Windows environment, however, it should be understood that any operating system can be used with the large functional software component.

Figure 13:
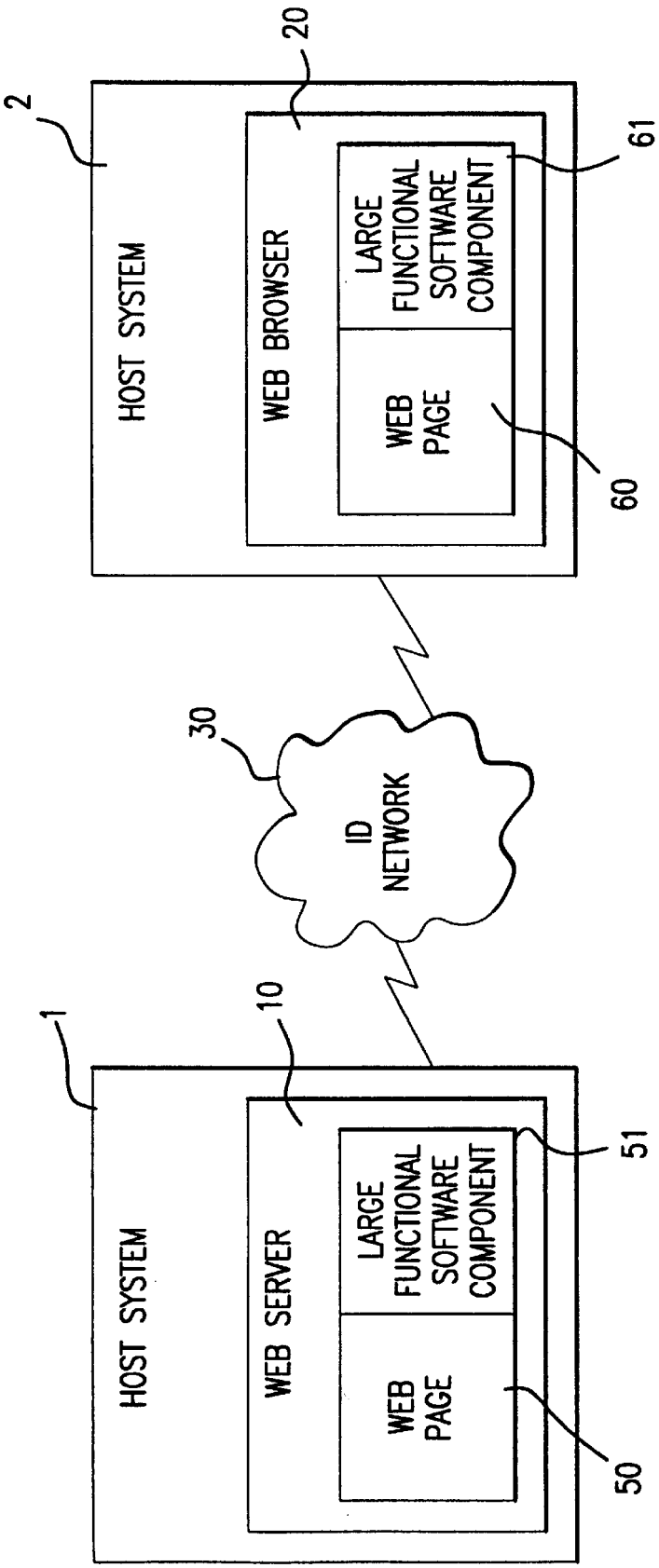
FIG. 13 is a block diagram of a system according to the features of the present invention.

FIG. 13 is a block diagram of a system including an embodiment of the present invention. The system includes a host system 1 and a client system 2 in an Internet protocol IP network 30. IP network 30 can be, for example, the public Internet or a private intranet and host system 1 and client system 2 can communicate across IP network 30 using a hyper-text transfer protocol (HTTP).

Host system 1 and client system 2 can be, for example, a personal computer or computer workstation, and generally include a data storage device, a memory device, a processor and a display. The memory device in host system 1 can store code and the processor can execute a web server 10. The data storage device in host system 1 can store a web page 50 and an associated large functional software component 51. Web page 50 can be written in the hyper-text mark-up language (HTML).

The memory device in client system 2 can store code and the processor can execute a web browser 20. The memory device in client system 2 can also download web page 60 and an associated large functional software component 61. Web browser 20 is a software component-capable web browser and can both display a web page 60 and execute large functional software component 61.

In operation, a user of client system 2 can use web browser 20 in order to transmit a request for web page 60 across IP network 30. The request can be, for example, a uniform resource locator (URL) for web page 60. Web server 10 can receive the request from web browser 20 and in response, can package and transmit web page 60 and large functional software component 61 to web browser 20 across IP network 30. Web server 10 packages web page 60 and large functional software component 61 based upon web page 50 and large functional software component 51 stored on host system 1. After downloading web page 60 and large functional software component 61, web browser 20 can display web page 60 to a user of client system 2 and can execute large functional software component 61. Large functional software component 61 only needs to be downloaded once and is executed by web browser 20.

What is claimed is:

1. A method for creating a large functional software component, comprising:
 copying a document class and a view class from a large functional software unit to an encapsulation class, the encapsulation class defining operation of the large functional software unit in the context of a web browser, the document class and the view class each containing references to an application class associated with the large functional software unit, the application class defining operation of the large functional software unit in a desktop operating system environment;
 modifying the references to refer to the encapsulation class; and
 modifying the encapsulation class to refer to the document class and the view class.

2. The method according to claim 1, wherein said encapsulation class is a word processing program.

3. The method according to claim 1, wherein said encapsulation class is a spreadsheet program.

4. The method according to claim 1, wherein said encapsulation class is a computer aided design (CAD) of electronic circuits program.

5. The method of claim 1, further comprising compiling the encapsulation class.

6. The method of claim 1, further comprising transmitting the large functional software unit and the encapsulation class to a client.

7. The method of claim 1, wherein the encapsulation class is an ActiveX control.

8. A computer-readable memory having stored thereon a plurality of instructions that, when executed by a processor, cause the processor to:
 copy a document class and a view class from a large functional software unit to an encapsulation class, the encapsulation class defining operation of the large functional software unit in the context of a web browser, the document class and the view class each containing references to an application class associated with the large functional software unit, the application class defining operation of the large functional software unit in a desktop operating system environment;
 modify the references to refer to the encapsulation class; and
 modify the encapsulation class to refer to the document class and the view class.

* * * * *